Aug. 13, 1968

H. OVERHOFF 3,396,434

MOLDING FASTENER

Filed Dec. 7, 1966

Inventor:
Heinrich Overhoff,
by Gordon Needleman
Atty.

United States Patent Office

3,396,434
Patented Aug. 13, 1968

3,396,434
MOLDING FASTENER
Heinrich Overhoff, Lorrach, Baden, Germany, assignor to
A. Raymond, Boden, Germany
Filed Dec. 7, 1966, Ser. No. 599,944
Claims priority, application Germany, Dec. 21, 1965,
R 42,271
1 Claim. (Cl. 24—73)

ABSTRACT OF THE DISCLOSURE

The molding fastener disclosed herein is of two-piece construction, metal and plastic, wherein the plastic head portion includes a means of engaging the metallic shank portion.

Background of the invention

Many different types of plastic molding fasteners are available on the market. In most cases, the head is connected to the shank by a screw or by a plastic rivet. These fastening devices are expensive to manufacture and are limited in their use because of dimensional problems.

Summary of the invention

This invention relates generally to fastening devices, and more specifically to molding fasteners. The inventor's new and unique method of sealing plastic elements formed in the head portion onto the shank portion alleviates the necessity of using a threaded attachment.

Description of the preferred embodiment

Figure 2:
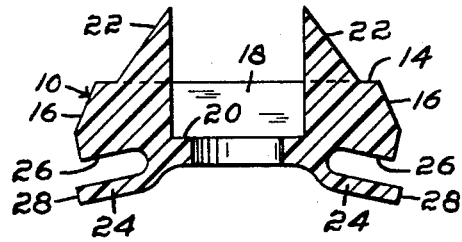
FIG. 2 is a section taken on line 2—2 of FIGURE 1.

In the drawing, there is shown a molding fastener comprising a head portion 10, formed of an organic polymeric material, such as a thermoplastic, and a shank element 12, formed of a rigid material such as brass or steel.

Figure 1:
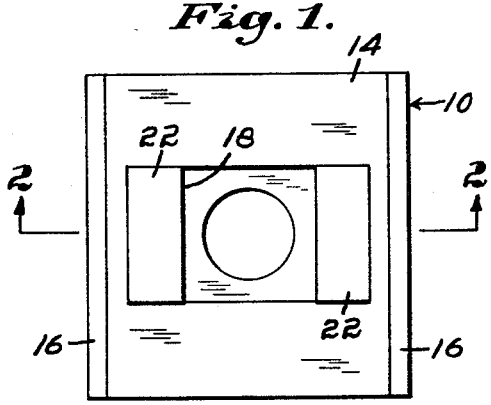
FIG. 1 is a top plane view of the head portion of the fastening device prior to engagement with the shank element.

The head portion 10 comprises a generally rectangular base portion 14 having two of its opposed sides 16, angled to provide an engagement portion for a trim piece and having a central aperture 18 formed therethrough. The aperture 18 includes an upper portion, proximate the upper surface of the base portion 14, generally rectangular in configuration and a lower portion which is tubular in configuration, and has a width less than that of the upper portion providing an internal shoulder 20 at their juncture. A right angle projection 22 extends from the upper surface of the base portion 14, adjacent each of the edges of the aperture 18, which in turn, is in substantially parallel relationship with the side edges 16. The projections 22 include an acute angle at the apex with the hypotenuse facing away from the aperture 18, as shown in FIGURE 2. The leg of each of the projections 22 continues on the same plane as the wall of the aperture 18, providing in effect an extension thereof. A flexible arm 24 extends from the lower surface 26 of the base portion 14, in close proximity to each of the side edges 16. Each of the legs 24 extends along the total length of the base portion 14, and has a connecting portion and a terminal portion 28, which extends from the connecting portion in angular relation to the plane of the lower surface 26, and has a free terminal edge which extends to the plane of the side edge 16, as shown in FIGURE 1.

The metallic shank element 12 comprises a flat rectangular plate 30, having an integral cylindrical shank 32, extending in right angle relationship applied therefrom.

Figure 3:
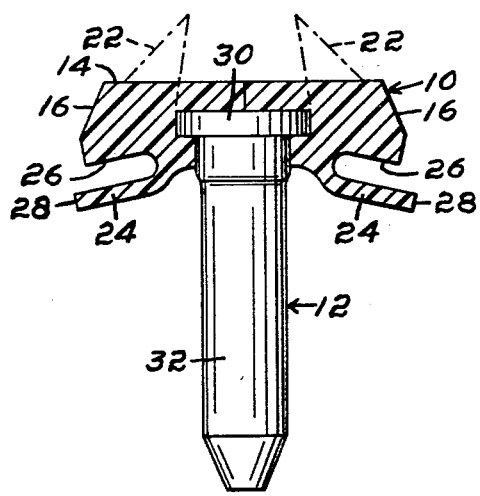
FIG. 3 is a section partly in elevation of the head portion engaged to the metal shank element with the projections fully engaged.

The shank element 12 is engaged to the head portion 10, by passing the shank 32, through the aperture 18, until the plate 30 butts against the internal shoulder 20. A heated member having a flat lower surface is pressed against the apexes of the projections 22, forcing them, due to the heat and pressure, into the upper portion of the aperture 18, completely filling that portion of the aperture 18, and sandwiching the plate 30, between the internal shoulder 20, and the displaced projections 22, as shown in FIGURE 3.

I claim:
1. The method of manufacturing a fastening device comprising forming a head portion of an organic polymeric material, said head portion having an apertured base portion and said base portion having a lower surface, the aperture formed in said base portion having an upper portion and a lower portion, said lower portion having a smaller width than said upper portion, thereby providing a shoulder within said base portion and selecting a separate shank element formed of metallic material, said shank element comprising a plate portion having a width greater than the width of said lower portion of said aperture and having a shank extending therefrom in right angle relation thereto, and said head portion having a projection extending from the upper surface thereof adjacent each of two sides of said upper portion of said aperture, placing said shank through said lower portion of said aperture and said plate portion into superposed abutting relationship with said shoulder within said head portion and then applying heat and pressure on to said projection forcing it into superposed abutted position over said plate.

References Cited
UNITED STATES PATENTS

| | | |
|---|---|---|
| 3,273,441 | 9/1966 | Biesecker. |
| 3,127,965 | 4/1964 | Weisenberger. |
| 1,867,354 | 7/1932 | Dickson _____ 85—54 X |

DONALD A. GRIFFIN, *Primary Examiner.*